United States Patent
Benedict

(10) Patent No.: US 10,286,270 B2
(45) Date of Patent: May 14, 2019

(54) MOTOR-DRIVEN GOLF BAG

(71) Applicant: SWISS BIRDIE INTERNATIONAL Sàrl, Lausanne (CH)

(72) Inventor: Jérôme Benedict, Lausanne (CH)

(73) Assignee: SWISS BIRDIE INTERNATIONAL SARL, Lausanne (CH)

( * ) Notice: Subject to any disclaimer, the term of this patent is extended or adjusted under 35 U.S.C. 154(b) by 144 days.

(21) Appl. No.: 14/435,305

(22) PCT Filed: Oct. 10, 2013

(86) PCT No.: PCT/IB2013/059259
§ 371 (c)(1),
(2) Date: Apr. 13, 2015

(87) PCT Pub. No.: WO2014/057447
PCT Pub. Date: Apr. 17, 2014

(65) Prior Publication Data
US 2015/0251066 A1 Sep. 10, 2015

(30) Foreign Application Priority Data

Oct. 12, 2012 (WO) .................. PCT/IB2012/055555

(51) Int. Cl.
| | |
|---|---|
| *A63B 55/57* | (2015.01) |
| *A63B 55/30* | (2015.01) |
| *B62B 5/00* | (2006.01) |
| *B62B 3/02* | (2006.01) |

(Continued)

(52) U.S. Cl.
CPC .............. *A63B 55/57* (2015.10); *A63B 55/30* (2015.10); *A63B 55/61* (2015.10); *B62B 3/02* (2013.01); *B62B 3/12* (2013.01); *B62B 5/0043* (2013.01); *A63B 2055/605* (2015.10); *A63B 2220/12* (2013.01); *A63B 2220/18* (2013.01); *B62B 2202/404* (2013.01)

(58) Field of Classification Search
CPC ........ B62B 2202/404; B62B 2202/406; A63B 55/087; A63B 55/08
See application file for complete search history.

(56) References Cited

U.S. PATENT DOCUMENTS

| | | | |
|---|---|---|---|
| 3,820,617 A | | 6/1974 | Groff |
| 3,941,398 A | * | 3/1976 | Nelson ...................... B62B 1/10 206/315.4 |
| 3,985,373 A | * | 10/1976 | Widegren .............. A63B 55/60 280/47.26 |

(Continued)

FOREIGN PATENT DOCUMENTS

| | | |
|---|---|---|
| DE | 90 17 869 | 1/1993 |
| DE | 203 07 742 | 9/2003 |

(Continued)

OTHER PUBLICATIONS

International Search Report for PCT/IB2013/059259, dated Mar. 13, 2014, four pages.

(Continued)

*Primary Examiner* — Kevin Hurley
(74) *Attorney, Agent, or Firm* — Nixon & Vanderhye, P.C.

(57) ABSTRACT

The invention relates to a golf bag (1) which includes an outer shell inside of which is arranged a cavity for containing clubs, characterised in that said golf bag also includes a propulsion system (2) forming an integral part of the bag (1).

5 Claims, 3 Drawing Sheets

Figure 1:
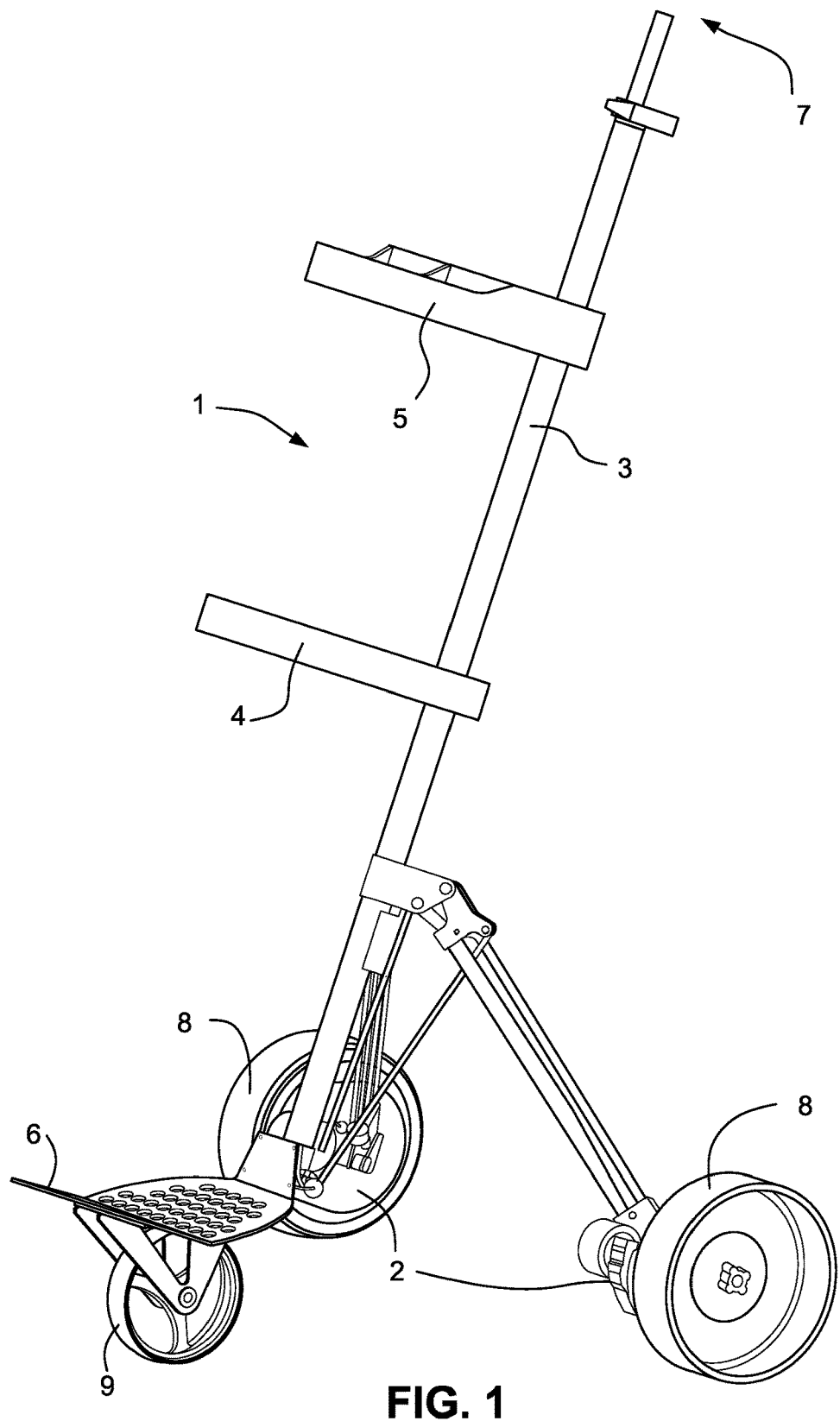

(51) Int. Cl.
*B62B 3/12* (2006.01)
*A63B 55/60* (2015.01)

(56) References Cited

U.S. PATENT DOCUMENTS

| | | | |
|---|---|---|---|
| 4,106,583 A | 8/1978 | Nemeth | |
| 4,657,100 A | 4/1987 | Lewis | |
| 4,848,504 A * | 7/1989 | Olson | B62B 5/0026 |
| | | | 180/19.1 |
| 5,180,023 A * | 1/1993 | Reimers | A63B 55/087 |
| | | | 180/167 |
| 5,350,982 A * | 9/1994 | Seib | B60L 11/1805 |
| | | | 280/DIG. 5 |
| 5,711,388 A | 1/1998 | Davies et al. | |
| 6,997,274 B2 * | 2/2006 | Metten | A63B 55/00 |
| | | | 180/19.1 |
| 8,365,850 B2 * | 2/2013 | Gal | 180/19.1 |
| 8,720,912 B2 * | 5/2014 | Liao | B62B 3/12 |
| | | | 280/47.24 |
| 8,764,030 B1 * | 7/2014 | Murphy | A63B 55/00 |
| | | | 280/47.17 |
| 2005/0252700 A1 | 11/2005 | Kitauchi et al. | |
| 2012/0061157 A1 * | 3/2012 | Whelan | A63B 55/00 |
| | | | 180/54.1 |
| 2013/0200595 A1 * | 8/2013 | Mackay | A63B 55/08 |
| | | | 280/655 |
| 2015/0367208 A1 * | 12/2015 | Mittiga | A63B 55/00 |
| | | | 206/315.6 |

FOREIGN PATENT DOCUMENTS

| | | |
|---|---|---|
| DE | 102 29 270 | 1/2004 |
| EP | 1 600 352 | 11/2005 |

OTHER PUBLICATIONS

Written Opinion (Non-English) of the ISA for PCT/IB2013/059259, dated Mar. 13, 2014, five pages.

* cited by examiner

MOTOR-DRIVEN GOLF BAG

This application is the U.S. national phase of International Application No. PCT/IB2013/059259 filed 10 Oct. 2013 which designated the U.S. and claims priority to International Application No. PCT/IB2012/055555 filed 12 Oct. 2012, the entire contents of each of which are hereby incorporated by reference.

FIELD OF THE INVENTION

The present invention relates to golf bags. It relates more specifically to the transportation of golf bags.

PRIOR ART

Mechanized transportation of a golf bag is usually effected by means of an electric trolley. This can contain a holder designed for the bag. The following patent publications describe such systems: DE 9017869 U, DE 20307742 U, EP 1600352 A, U.S. Pat. No. 4,106,583.

The electric golf trolleys of the prior art have at least two drawbacks, specifically their weight, which is often substantial, and the need to transport two separate bulky objects, namely the trolley itself (often with a large and heavy battery) and the user's golf bag. The coexistence of these two heavy objects makes transportation problematic, not only outside golf courses, but also on the courses themselves, in particular when moving from one hole to another without using the paths provided for that purpose. Moreover, placing bags on the trolleys is an operation which is not always easy. Furthermore, in the event of the electric trolley breaking down or the battery running out on the course, the users may have to leave said trolley where it is because of the weight of the electric trolley/bag assembly. Finally, the combined presence of the users' bags and electric golf trolleys in the facilities of companies running golf courses creates substantial problems in terms of storage, at least doubling the required area.

There is therefore a need to remedy the abovementioned problems.

GENERAL DESCRIPTION OF THE INVENTION

The present invention consists in bringing together, in a single object, a golf bag and a propulsion system so as to create an ultra-lightweight self-propelled golf bag. Indeed, the propulsion part uses, for its rigidity, the structure of the portable golf bag, which avoids what has up to now been the usual drawback of a double structure, specifically that of the bag and that of the electric trolley. The weight advantage is substantial and makes it possible to mount a small battery.

The invention relates more precisely to a golf bag as defined in the claims.

These features make it possible for the user to carry at once, on his or her shoulders, the bag and its propulsion components, which makes not only travel easier, but also movement in hard-to-reach parts of golf courses, and also maintenance.

Above all, however, this solution makes it possible for the user to easily mitigate, by carrying the bag, the usual drawback linked to breakdowns or insufficient battery charges, which often result in the need to leave the electric trolley where it is.

Preferably, the part reserved for balancing the bag and for propulsion is deployed with a single, easy and small horizontal movement, while it is possible by means of the reverse operation to close the aforementioned elements in the same manner. These are held in their position by a closing system.

DETAILED DESCRIPTION OF THE INVENTION

The invention will be better understood below with reference to an embodiment illustrated by some figures.

FIG. 1 represents a golf bag 1 according to the invention, without its outer envelope 10, with a propulsion system 2 in the deployed position.

Figure 2:
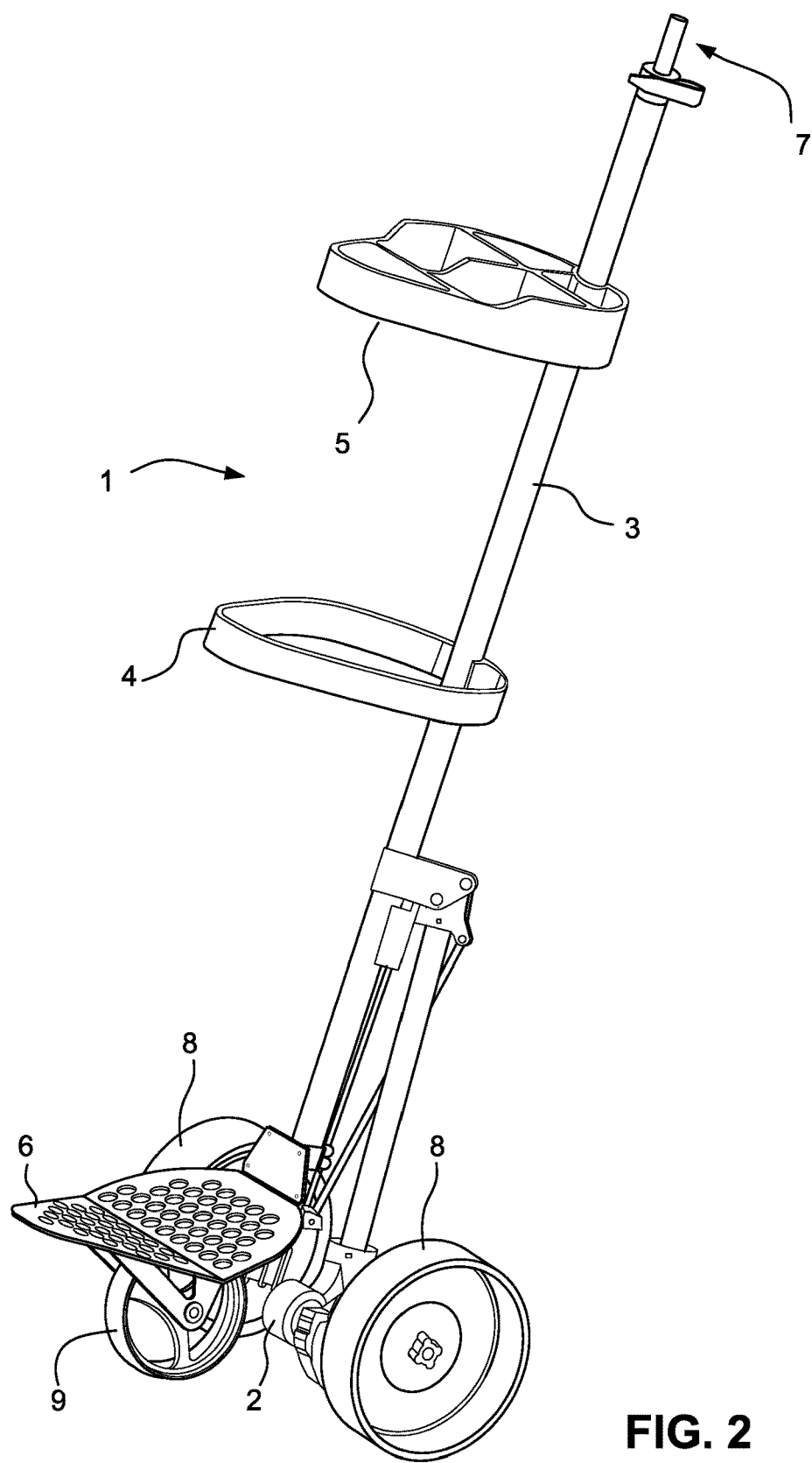

FIG. 2 represents the same bag 1 as that of FIG. 1, but with a propulsion system 2 in the retracted position.

Figure 3:
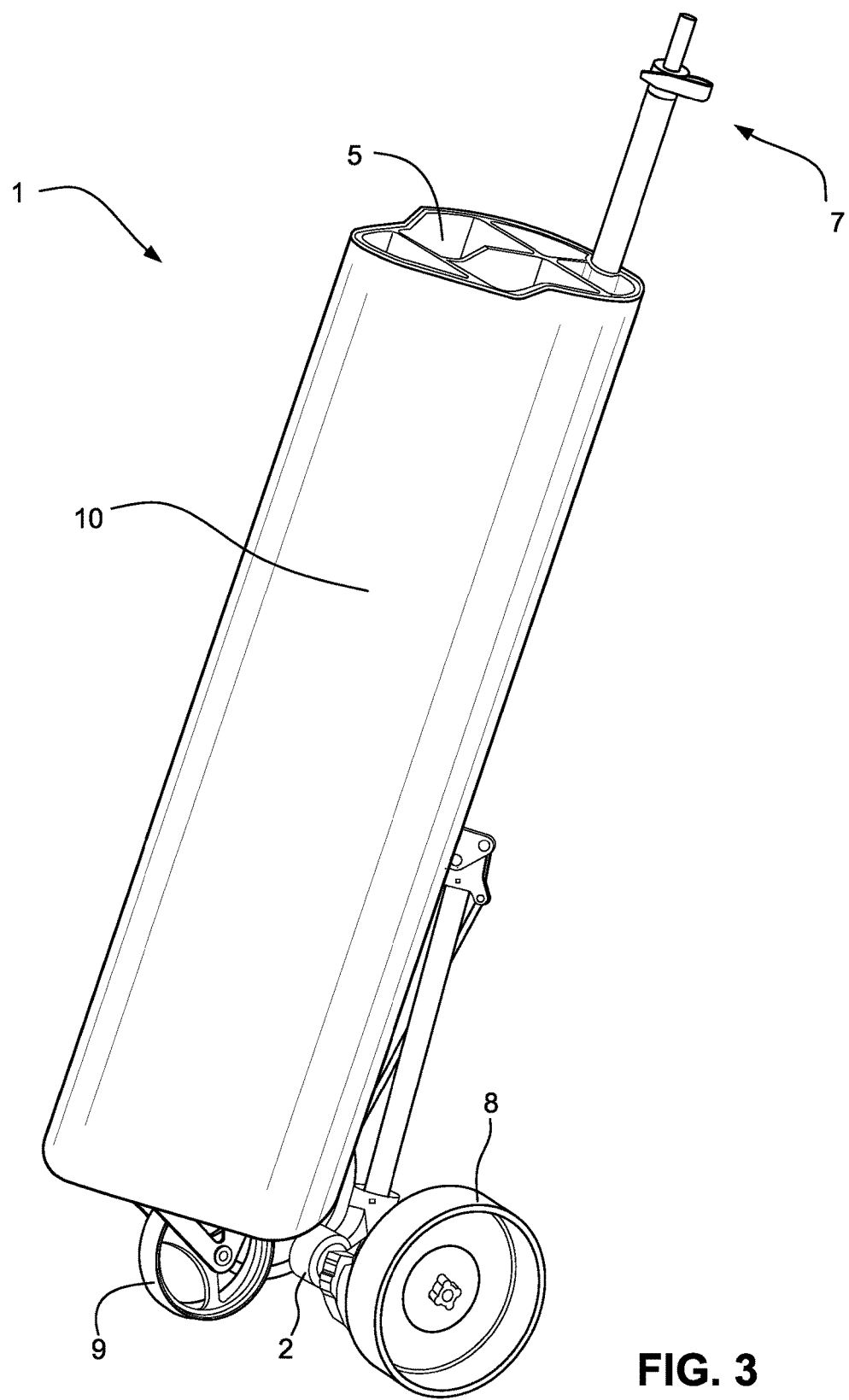

FIG. 3 represents the same bag 1 as that of FIG. 2, with a propulsion system 2 in the retracted position, and with an outer envelope 10.

In the embodiments depicted in FIGS. 1-3, the bag 1 comprises an outer envelope 10 inside which there is arranged a compartment designed to contain golf clubs. The bag 1 comprises a propulsion system 2 that forms an integral part of the bag 1. The bag 1 comprises a frame components 3-6 consisting of a stem 3, one of whose ends 7 comprises gripping means such as a handle. The bag 1 comprises annular-shaped elements 4, 5 whose diameter is substantially identical to that of the compartment enclosed by the outer envelope 10. As shown in FIGS. 1-2, there are division elements in the top, rigid, annular-shaped element 5 (also referred to as a crown, as further described below). The bag 1 has a rigid base plate 6.

Golf bags have the drawback of hardly being reparable when wear or damaging events cause a deterioration of their outer envelope. In one of its variants, the present invention makes it possible to entirely avoid this drawback, by allowing the user, by means of simple maneuvers, to quickly change the outer envelope. This solution further allows the user to change, in a few moments, the external appearance of their bag as they wish. By contrast, conventional bags can only be abandoned by their users when the latter are no longer happy with their external appearance, which results in considerable material losses since the internal structure of the bag is discarded at the same time as the outer envelope.

Advantageously, a system of attachment points on the outer envelope of the bag allows the user to move, as needed, the pockets designed for transporting the material required for playing golf.

In the examples shown in FIGS 1-3 the rigidity of the upper portion of the bag is maintained by a crown 5 which is easily removed and which also serves to hold the outer envelope 10 and to distribute the user's clubs by means of divisions.

The rotational speed of the wheels 8 is controlled by a variable speed drive which is controlled manually or electronically when the bag is controlled remotely.

When the bag is folded and its handle is oriented in a direction favorable for storage or for transport, it takes up no more space than a standard bag, which brings the considerable advantage, in comparison with the conventional solution of trolley+bag, of on one hand reducing the overall bulkiness for the user but above all of considerably reducing the space required in the caddie masters' premises for storing users' material, since users usually store both their bag and their trolley therein.

The electrical wiring can be entirely hidden within the structure of the bag, whose motors are supplied by a small, high-capacity battery, preferably of the lithium-ion or LiPo type.

The same system can be used simply as a trolley to be pushed or pulled, in its configuration without a motor and without a battery.

The same system, without wheels, consists of a standard golf bag whose external appearance can be modified by the user by replacing its outer envelope and/or by moving the pockets.

In all its configurations, the bag can be carried by a system of straps which are secured to the shoulders of the user and which can be hidden within the outer envelope of the bag.

It goes without saying that the invention is not limited to the example described above. It covers any motor-driven golf bag as defined in the main claim.

In particular, it will be noted that the outer envelope of the bag is not necessarily interchangeable, that the propulsion system does not necessarily have a deployed position and a retracted position, that the number of wheels can be less than or greater than 3, that the wheels can be replaced by other propulsion elements, e.g. caterpillar tracks, etc. . . .

The invention claimed is:

1. A golf bag comprising
    a frame that includes
        a rigid stem,
        a gripping means at a top area of the stem,
        a rigid base plate connected to a bottom area of the stem, and
        two annular-shaped elements connected to the stem between the top area and the bottom area of the stem and whose diameters are substantially identical to a compartment designed to contain golf clubs, wherein at least one of the two annular-shaped elements is rigid and is located closer to the top area than the other annular-shaped element,
    an outer envelope connected to the two annular-shaped elements and that forms the compartment, and
    a propulsion system that forms an integral part of the golf bag and that is connected to the stem,
        wherein said golf bag can be carried by a user on his or her shoulders during a round of golf,
        wherein the propulsion system has a folding configuration with at least two positions;
            i) a deployed unfolded position for when the bag is to be driven by the propulsion system, and
            ii) a retracted folded position folded position for when the bag is to be carried by the user or stored,
        wherein the golf bag further comprises two wheels, termed active wheels, which are set in rotation by the propulsion system, and a third wheel, termed a passive wheel, which is not connected to the propulsion system and which is set in rotation when the bag is moved by the propulsion system, and
        wherein the propulsion system comprises motors that separately drive the active wheels.

2. The golf bag according to claim 1, wherein the folding configuration comprises a separate set of folding arms and pivot points that correspond to each active wheel.

3. A golf bag comprising
    a frame that includes
        a rigid stem,
        a gripping means at a top area of the stem,
        a rigid base plate connected to a bottom area of the stem, and
        two annular-shaped elements connected to the stem between the top area and the bottom area of the stem and whose diameters are substantially identical to a compartment designed to contain golf clubs, wherein at least one of the two annular-shaped elements is rigid and is located closer to the top area than the other annular-shaped element,
    an outer envelope connected to the two annular-shaped elements and that forms the compartment, and
    a propulsion system that forms an integral part of the golf bag and that is connected to the stem,
        wherein said golf bag can be carried by a user on his or her shoulders during a round of golf,
        wherein the propulsion system has a folding configuration with at least two positions:
            i) a deployed unfolded position for when the bag is to be driven by the propulsion system, and
            ii) a retracted folded position for when the bag is to be carried by the user or stored,
        wherein the golf bag further comprises two wheels, termed active wheels, which are set in rotation by the propulsion system, and a third wheel, termed a passive wheel, which is not connected to the propulsion system and which is set in rotation when the bag is moved by the propulsion system.

4. The golf bag according to claim 3, wherein the propulsion system comprises motors that separately drive the active wheels.

5. The golf bag according to claim 4, wherein the folding configuration comprises a separate set of folding arms and pivot points that correspond to each active wheel.

* * * * *